United States Patent
Zertuche-Rodriguez et al.

(10) Patent No.: US 7,527,825 B2
(45) Date of Patent: May 5, 2009

(54) METHOD FOR AVOIDING THE AGGLOMERATION OF PELLETS TREATED AT HIGH TEMPERATURES

(75) Inventors: Cesar-Emillio Zertuche-Rodriguez, Monterrey (MX); Ricardo Benavides-Pérez, Monterrey (MX); Jose-Gertrudi Bocanegra-Rojas, Monterrey (MX)

(73) Assignee: Servicios Industriales Penoles S.A. De C.V., Monterrey (MX)

( * ) Notice: Subject to any disclaimer, the term of this patent is extended or adjusted under 35 U.S.C. 154(b) by 557 days.

(21) Appl. No.: 11/102,190

(22) Filed: Apr. 8, 2005

(65) Prior Publication Data

US 2005/0274931 A1    Dec. 15, 2005

Related U.S. Application Data

(63) Continuation-in-part of application No. 10/053,315, filed on Jan. 17, 2002, now abandoned.

(51) Int. Cl.
*B05D 5/08* (2006.01)
*C09K 3/00* (2006.01)
*C01F 5/14* (2006.01)
*C04B 35/63* (2006.01)
*C04B 35/64* (2006.01)

(52) U.S. Cl. ............... 427/215; 427/213.3; 427/213.31; 427/208.2; 427/207.1; 252/382; 252/383; 423/268

(58) Field of Classification Search .......... 252/382, 252/383; 247/215
See application file for complete search history.

(56) References Cited

U.S. PATENT DOCUMENTS

| | | | | |
|---|---|---|---|---|
| 4,412,844 A | * | 11/1983 | Collins et al. ............... 44/301 |
| 5,487,879 A | * | 1/1996 | Witkowski et al. .......... 423/155 |
| 5,624,568 A | * | 4/1997 | Pomrink et al. ............... 516/88 |
| 5,762,901 A | * | 6/1998 | Richmond et al. .......... 423/635 |
| 5,811,069 A | * | 9/1998 | Zertuche-Rodriguez et al. ........................ 423/265 |
| 5,877,247 A | * | 3/1999 | Mahar ........................ 524/433 |
| 5,906,804 A | * | 5/1999 | Aral et al. .................... 423/265 |
| 5,908,801 A | * | 6/1999 | Lechuga-Priego et al. ... 501/112 |
| RE36,369 E | * | 11/1999 | Wajer et al. .................. 423/155 |
| 6,500,882 B1 | * | 12/2002 | Hiraishi et al. .............. 523/205 |
| 2003/0141485 A1 | * | 7/2003 | Zertuche-Rodriguez et al. ......................... 252/382 |
| 2005/0274931 A1 | * | 12/2005 | Zertuche-Rodriguez et al. .. 252/381 |

* cited by examiner

*Primary Examiner*—Joseph D Anthony
(74) *Attorney, Agent, or Firm*—Abelman, Frayne & Schwab

(57) ABSTRACT

A method for avoiding the agglomeration of pellets of several kinds of materials when treated at high temperatures, which comprises: covering the pellets with a long term stabilized magnesium hydroxide suspension which can be stored for at least three months without substantial agitation and without experiencing substantial settlement and solid hard substrate formation, comprising a solid content of about 51% to 61%; a water content of about 39% to 49%; a viscosity of about 500 to 1,500 cp.; an average particle size of about 1 to 2.5 microns; a Mg(OH).sub.2 content of about 50% to 60%; an equivalent magnesium oxide content of 34% to 42%; including a compound that improves the adhesion of the suspension to the pellets at a concentration of at least 30% in an amount of 0.5 to 5%, by weight, on a dry basis and an anionic polyelectrolyte as a dispersant agent, and which is obtained by washing, filtering and repulping magnesium hydroxide solids to obtain agglomerated solid particles, dispersing the agglomerated solid particles by comminution in a dispersing equipment, to reduce the particle size providing a dispersed product, grinding the dispersed product, to additionally reduce the particle size to about 2 microns; and adding a compound that improves the adhesion of the suspension to the pellets at a concentration of at least 30% in an amount of 0.5 to 5% on a dry basis and an anionic polyelectrolyte at a concentration of at least 25%, in an amount of about 0.5 to 2.5%, by weight, on a dry basis, as a dispersant agent.

3 Claims, No Drawings

METHOD FOR AVOIDING THE AGGLOMERATION OF PELLETS TREATED AT HIGH TEMPERATURES

CROSS-REFERENCE TO RELATED APPLICATIONS

This application is a Continuation-in-Part of application Ser. No. 10/053,315, filed Jan. 17, 2002, now abandoned.

BACKGROUND OF THE INVENTION

A. Field of the Invention

This invention relates to methods for avoiding the agglomeration of pellets of several kinds of materials when treated at high temperatures and, more particularly, to a method for avoiding the agglomeration of pellets by covering the pellets with a long term-stabilized magnesium hydroxide suspension, having a stability of at least three months without substantially settling and without forming a hard solid substrate including a compound that improves the adhesion of the suspension to the pellets B. Description of Related Art In some treatments of bricks or pellets of materials such as dolomite, iron mineral, etc., in which it is necessary to sinter a plurality of bricks inside furnaces at high temperatures, there exists a tendency of said bricks or pellets to adhere to each other producing an agglomerate of bricks.

One of these treatments is the iron reduction of mineral iron powder and pellets inside a furnace at high temperatures. When the sintering is complete, usually some or all of the pellets are agglomerated in a solid mass which obstruct the furnace exit and makes necessary to apply a mechanical shock in order to separate each pellet from the agglomerate.

In order to avoid the agglomeration of the pellets during sintering, several compounds were tested which must be applied to the pellets surface before the sintering process. Among these compounds, there were tested slurries of magnesium hydroxide, calcium hydroxide, bauxite and even cement, but none of these compounds produced the expected results and had some disadvantages when used for the purpose referenced above.

Some of the principal disadvantages, in common with all the compounds previously mentioned, are that the compounds must be continuously stirred to maintain a constant concentration, and that once the compound was applied to the pellets, the compounds proved to have a very poor adherence to the pellets, since the cover, once it dries, tends to separate from the pellet simply by the movement produced by the normal manipulation of the pellets.

The magnesium, and particularly the magnesium hydroxide, has a great number of applications, such as a flame retardant, neutralization of acid waste streams, as well as for pharmacological purposes and detergent production.

In some production plants, the magnesium hydroxide is produced from a magnesium chloride brine and burnt dolomite, in order to obtain dead burned magnesium oxide, to be used mainly in the manufacture of refractory bricks.

Other methods for the production of magnesium hydroxide are:

Production of magnesium hydroxide by reacting dolomite or limestone with sea water or chloride or magnesium brines.

Production of magnesium hydroxide by thermal decomposition of chloride or magnesium brines.

Production of magnesium hydroxide by burning natural magnesite (magnesium carbonate) in order to obtain magnesium oxide which afterwards is hydrated with water in order to obtain magnesium hydroxide.

Production of magnesium hydroxide by hydrating low cost magnesium oxide (such as that which originates in China).

Production of magnesium hydroxide by reacting sodium hydroxide with magnesium sulfate or Epsom salt.

Production of magnesium hydroxide from sodium hydroxide and chloride and magnesium brines.

From ammonia or ammonium hydroxide with chloride or magnesium brines.

Looking for a suitable substance for covering the pellets and iron powder for avoiding its agglomeration when treated at high temperatures, trials were carried out for the production of magnesium hydroxide.

The first trials commenced by using a magnesium hydroxide paste obtained by: mixing burned dolomite and magnesium chloride brine in order to obtain a reaction between both compounds; washing the product of said reaction and conditioning the product in order to obtain a suspension having a high covering area per gram of substance (surface area covered by each gram of substance) and a viscosity of less that 100 centipoises, which would allow its being pumped by any kind of pumping means such as a centrifugal pump, a diaphragm pump or a peristaltic pump. Said suspension was subsequently conditioned by the addition of a compound that improves the adhesion of the suspension to the pellets by which the viscosity of the suspension was increased to approximately 1,000 centipoises.

When is necessary to send the magnesium hydroxide paste or suspension to locales remote from the production plant, as well as for further processing, it is necessary to store a magnesium hydroxide suspension for long terms in a storage container. Under such circumstances, the solid particles of the suspension normally tend to settle out producing a hard solid substrate as a hard cake in the bottom of the storage container, which is often very difficult to remove. The remaining suspension under such circumstances, results in a useless material since it doesn't have the required magnesium hydroxide concentration nor the required particle size in suspension and, therefore, it has to be poured from the storage container and discarded in order to remove the hard solid cake from the bottom of the container, resulting in increased costs and high raw material losses.

Therefore, it would be highly desirable to have a method for covering pellets of a variety of materials in order to avoid the agglomeration of a plurality of pellets when stored or subjected to a heat treatment thereof using s magnesium hydroxide suspension having good adhesive properties and the capability of being stored for long periods of time without substantial settling and cake formation.

In accordance with the present invention a method for avoiding the agglomeration of pellets of several kinds of materials when treated at high temperatures is provided, which comprises: covering the pellets with a a 50-60% magnesium hydroxide suspension, called "Femag HL" having a solid content between about 51% to 61%, a water content of from about 39% to 49%, a viscosity of about 1000 centipoises (cp)., a particle size of about 2 microns, a chloride content less than about 0.6% by weight, a calcium content of less than about 1%, a pH greater than about 10, an equivalent magnesium oxide content of about 34% to 42%, a specific gravity of about 1.42 to 1.52, and including one or more anionic polyelectrolytes as a dispersant agent, at a concentration of at least about 25%, in an amount of about 0.5 to 2.5% on a dry basis, and a compound that improves the adhesion of the suspension to the pellets developed specifically for the above referred purpose called "GBC200" comprising an acrylic-styrene emulsion, at a concentration of at least about 30% in an amount of about 0.5 to 5%, preferably about 1.5% to 2% on a dry basis, exhibiting a stability of at least three months without substantial agitation.

By covering the pellets with the magnesium hydroxide suspension as disclosed by the method of the present invention, there are obtained the following benefits:

Lower maintenance costs of conveyor belts, rollers, sieving devices, etc.

Easier product manipulation procedures.

Reduced emanation of hazardous and polluting elements to the environment. High quality iron pellets are obtained.

Benefits to the steel industry with respect to slag fluidity.

SUMMARY OF THE INVENTION

It is therefore a main object of the present invention, to provide a method for avoiding the agglomeration of pellets of several kinds of materials when treated at high temperatures, which comprises: covering the pellets with a magnesium hydroxide suspension, having good adherence properties and a high covering area per gram of suspension.

It is another object of the present invention, to provide a method for avoiding the agglomeration of pellets of the above disclosed nature, wherein the magnesium hydroxide suspension, has a stability of at least three months without substantial agitation and has a very low tendency to settle down and forming a hard cemented cake.

It is a further object of the present invention, to provide a method for avoiding the agglomeration of pellets of the above disclosed nature, wherein the magnesium hydroxide suspension magnesium has a content of a compound that improves the adhesion of the suspension to the pellets at a concentration of at least about 30%, in an amount of about 0.5 to 5% on a dry basis.

It is a further object of the present invention, to provide a method for avoiding the agglomeration of pellets of the above disclosed nature, wherein the magnesium hydroxide suspension magnesium has a solids content of about 51% to 61% by weight; a water content of about 39% to 49% by weight; a viscosity of about 500 to 1,500 cp.; an average particle size of about 1 to 2.5 microns; a $Mg(OH)_2$ content of about 50% to 60% by weight; a chloride content of less than about 0.6% by weight on a dry basis; a calcium content of less than about 1% by weight on a dry basis; a pH of about 10.5 to 12; an equivalent magnesium oxide content of about 34% to 42% by weight; a specific gravity of about 1.42 to 1.52, and including at least one anionic polyelectrolyte as a dispersant agent, at a concentration of at least about 25%, in an amount of about 0.5 to about 2.5%, by weight, on a dry basis and a compound that improves the adhesion of the suspension to the pellets having a concentration of at least about 30% in an amount of about 0.5 to about 5%, by weight, on a dry basis; adapted to being stored for at least three months without substantial agitation and without experiencing substantial settlement, while avoiding the formation of a solid, hard substrate.

These and other objects and advantages of the present invention will be apparent to those persons having ordinary skill in the art, from the following description of the invention, referring to specific examples of practice.

DETAILED DESCRIPTION OF THE INVENTION

The invention will be described by making reference to some specific examples of the application of the method of the present invention by covering pellets of different materials in order to avoid the agglomeration thereof when treated at high temperatures with a magnesium hydroxide suspension having a compound that improves the adhesion of the suspension to the pellets and having a stability of at least three months without substantial agitation.

The magnesium hydroxide used by the method of the present invention, may result from the reaction of a magnesium chloride brine and "Dolime", which is a calcium and magnesium oxide obtained from the calcination of dolomite, by the following reaction:

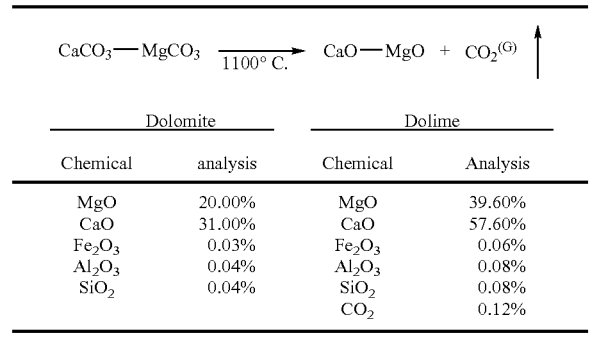

From the reaction of the magnesium chloride with the "Dolime", a precipitated magnesium hydroxide is obtained in a calcium chloride liquor, in accordance with the following reaction:

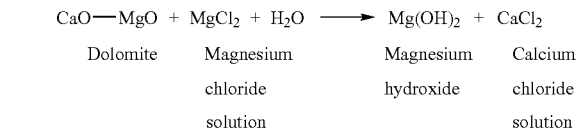

The magnesium hydroxide suspension used by the process in accordance with the present invention may comprise:

washing the magnesium hydroxide;

filtering and repulping the magnesium hydroxide solids in order to obtain less than about 0.6% of chloride values; this material, which is 50% of the product, has a particle size of about 4.0 microns, which are mainly crystals of agglomerated $Mg(OH)_2$, having a crystal size of about 0.4 microns;

dispersing the agglomerated solid particles by comminuting in a dispersing equipment having a cutting disc of, for example, polypropylene, stainless steel, etc., rotating at a speed of about 1200 to 3000 RPM, for about 20 to 30 minutes, in order to reduce the particle size;

grinding the dispersed product in a sand mill employing, for example, zirconium silicate, glass or stainless steel balls having a diameter of less than about 1.5 mm, as a milling media, to further reduce the particle size to guarantee that at least about 50% of the product has a particle size of about 2 microns, since the finer the particle size the better the degree or level of stabilization which can be achieved;

adding one or more anionic polyelectrolytes, at a concentration of at least about 25% in an amount of about 0.5 to 2.5% on a dry basis, as a dispersant agent which favors the stability of the suspension by providing electric charges which reduces the tendency of the particles to agglomerate and settle out;

adding a compound that improves the adhesion of the suspension to the pellets, for example, a styrene-acrylic emulsion, at a concentration of at least about 30% in an amount of about 0.5 to 5%, by weight, but preferably between about 1.5% to 2.0%, by weight, on a dry basis and dispersing the suspension with the compound that improves the adhesion of the suspension to the pellets for about 10 to 15 minutes in dispersing equipment comprising a container, an agitator and a stainless steel and/or polypropylene cutting disc;

storing the magnesium hydroxide suspension obtained in this manner in a storage tank where it can be stored for at least three (3) months without substantial agitation without experiencing a tendency to settle out to form a hard solid cake in the bottom of the storage tank, or thickening of the solid particles of the suspension used to cover the pellets.

It has been found that the grinding step is necessary because, although the product obtained in the dispersion step has a low viscosity and consequently a good fluidity, it still does not possess the required particle size characteristics to promote the desired stability since some of the particles still have a size of about 4 to 10 microns and have a tendency to settle out, sometimes in as short a period as a few hours.

Furthermore, although the particle size obtained by the milling step results in a reduced tendency to settle out, this factor alone still does not guarantee the long term stabilization which is desired, and therefore, the anionic polyelectrolyte is necessary for obtaining the desired level of stability in combination with the proper particle size.

The anionic polyelectrolytes are macromolecules which originate from monomeric units with ionizable groups as opposed to a simple electrolyte such as sodium chloride in which the cation $Na^+$ and the anion $Cl^-$ are relatively small and similar in size. A polyelectrolyte is characterized by a macro-ion which is the vertebral column (a large ion having a similar number of charged groups connected by bonds) and an equivalent number of independent small charges and of opposite charge. Because of their high molecular weight these are also known as dispersant resins.

Examples of anionic polyelectrolytes are sodium polyacrylate, ammonium poly(styrene/maleate), among others.

Although the suspension used by the method of the present invention has been disclosed as being obtained from a reaction between a magnesium chloride brine and "Dolime", the magnesium hydroxide can also be obtained from the following processes:

Production of magnesium hydroxide by thermal decomposition of chloride or magnesium brines.

Production of magnesium hydroxide by burning natural magnesite (magnesium carbonate) in order to obtain magnesium oxide which afterwards is hydrated with water in order to obtain magnesium hydroxide.

Production of magnesium hydroxide by hydrating low cost magnesium oxide (such as that which originates in China).

Production of magnesium hydroxide by reacting sodium hydroxide with magnesium sulfate or Epsom salt.

Production of magnesium hydroxide form sodium hydroxide and chloride and magnesium brines.

From ammonia or ammonium hydroxide with chloride or magnesium brines.

The following are examples of the specific process for obtaining the magnesium hydroxide suspension in accordance with the present invention.

EXAMPLE 1

A magnesium hydroxide suspension in accordance with the present invention was prepared.

1. 8.9 kilograms of burned dolomite was reacted with 75 liters of a magnesium chloride brine in a tank while maintaining agitation to obtain a suspension of magnesium hydroxide solids and a solution of calcium chloride.

2. The magnesium hydroxide solids contained in solution were allowed to settle inside a clarifier to concentrate the magnesium hydroxide at the bottom of the clarifier.

3. The magnesium hydroxide solids were filtered, from the bottom of the clarifier, in a vacuum filter, until a paste was obtained containing 55%, by weight, of magnesium hydroxide and 45%, by weight, of a solution containing water plus calcium chloride.

4. 12 liters of water per 100 grams of paste, obtained in step 3 above, was added in order to slowly eliminate the calcium chloride by dilution.

5. The solids contained in solution were allowed to settle and then they were filtered in a vacuum filter.

6. Steps 4 and 5 were repeated two (2) more times.

7. The final suspension and the settled solids were then filtered in a vacuum filter in the absence of atmosphere to obtain a paste containing 53%, by weight, of solids and 47%, by weight, of water and having a viscosity of 4,800 centipoises and a chloride content of 0.37%, by weight.

8. The magnesium hydroxide paste was dispersed by comminuting the paste in dispersing equipment equipped with a stainless steel cutting disc which rotated at a speed of 1200 rpm for a period of fifteen (15) minutes. The dispersion of the magnesium hydroxide paste was carried out in the presence of 1.5%, by weight, of an anionic polyelectolyte having a sodium polyacrylate base (QM 600).

9. The magnesium hydroxide paste was then comminuted in a sand mill to obtain particles having a size between about 1.5 and 3 microns.

10. The magnesium hydroxide paste was dispersed again by comminuting it in dispersing equipment having a stainless steel cutting disc rotating at a speed of 1200 rpm for a period of eight minutes in the presence of a styrene acrylic emulsion, in an amount of 5% by weight, having a 50% solids content (GBC 200, Servicios Industriales Penoles, S.A. de C.V. of Monterrey, Mexico).

11. Adding an acrylic-styrene emulsion as a compound that improves the adhesion of the suspension to the pellets.

EXAMPLE 2

A sample of a magnesium hydroxide suspension prepared in accordance with Example 1 above was divided into three (3) portions.

Each portion was diluted with water in order to obtain concentrations of 1, 2 and 5%, respectively.

Adhesion tests were carried out for each of the samples by covering iron mineral pellets with each of the portions. An additional adhesion test was carried out using a sample containing cement at a concentration of 15% for comparison purposes, as well as another adhesion test using a control sample having no adhesion additives, The five (5) samples were placed inside a laboratory reactor in order to carry out the mineral fusion and the following results were obtained:

| Sample | % of remnant agglomerates |
|---|---|
| Control, without additives | 87 |
| Cement suspension at 15% | 30 |
| Magnesium suspension at 5% | 4 |
| Magnesium suspension at 2% | 10 |
| Magnesium suspension at 1% | 19 |

The best results were obtained with the magnesium hydroxide suspension at 5% due to the lesser quantity of agglomerated pellets produced at the reactor exit.

EXAMPLE 3

A sample of a magnesium hydroxide suspension prepared in accordance with Example 1 above was divided into six (6) portions.

Two portions were diluted with water in order to obtain a concentration of 2%, another two portions were diluted to obtain a concentration of 3% and the last two portions were diluted to obtain a 5% concentration.

Each portion was used to cover iron mineral pellets. Three (3) of the samples were maintained concentrations of 2, 3 and 5%, respectively, while the other three (3) samples were air blown to eliminate the excess water to determine if the adherence of the magnesium hydroxide suspension to the pellets decreased.

The six (6) samples were placed in a laboratory reactor in order to carry out the mineral fusion and the following results were obtained:

| Sample | % of remnant agglomerates |
| --- | --- |
| Magnesium suspension at 2% | 50 |
| Magnesium suspension at 2% air blew | 57 |
| Magnesium suspension at 3% | 15 |
| Magnesium suspension at 3% air blew | 24 |
| Magnesium suspension at 5% | 50 |
| Magnesium suspension at 5% air blew | 57 |

It can be concluded from the foregoing results that by blowing air into the samples before placing them inside the reactor, the effectiveness of the magnesium hydroxide suspension of the present invention was lost since it resulted in a greater percentage of agglomerated pellets.

EXAMPLE 4

To each of four (4) samples of a magnesium hydroxide suspension prepared in accordance with Example 1 above there were added differing quantities of the GBC 200 additive compound that improves the adhesion of the suspension to the pellets to each sample, ranging from 1% to 3%.

The four samples were diluted with water until a final concentration of 5% was obtained which was used to cover the iron mineral pellets. Subsequently, the pellets covered with the magnesium hydroxide suspension were placed in a reactor in order to carry out the iron fusion and the following results were obtained with regard to the adherence of the magnesium hydroxide to the pellets. A sample containing a suspension of cement at a concentration of 15% without any additive was employed as a control.

| Sample | % of remnant agglomerates |
| --- | --- |
| Magnesium suspension with 1% of additive | 14 |
| Magnesium suspension with 1.5% of additive | 9 |
| Magnesium suspension with 2% of additive | 8 |
| Magnesium suspension with 3% of additive | 8 |
| Cement suspension at a 15% without additive | 18 |

From the above experiment it can be concluded that a lower percentage of agglomerates were obtained when 2% and 3% of the compound that improves the adhesion of the suspension to the pellets GBC 200 was added.

EXAMPLE 5

Three (3) samples of a stable magnesium hydroxide suspension prepared in accordance with Example 1 were burned at a temperature of 900.degree. C. in order to obtain magnesium oxide.

After obtaining the magnesium oxide, water was added to the magnesium oxide in order to convert it to magnesium hydroxide and to adjust its concentration to 55%.

The suspension obtained was divided into a first, a second and a third portion, to which were added 1%, 2% and 3% of the additive compound that improves the adhesion of the suspension to the pellets GBC 200, respectively, and diluted with water in order to obtain a magnesium hydroxide concentration of 5%.

Each sample was used to cover different iron pellets which afterwards were placed inside a laboratory reactor in order to carry out an iron fusion at a temperature of 950.degree. C.

As a test or control sample, other iron pellets were covered with a cement suspension at a concentration of 15% and placed inside the same reactor. The following results were obtained:

6% of Sample agglomerates remaining Magnesium suspension with 1% of additive 15 Magnesium suspension with 2% of additive 9 Magnesium suspension with 3% of additive 8 Cement suspension at a 15% 12

| Sample | % of remnant agglomerates |
| --- | --- |
| Magnesium suspension with 1% of additive | 15 |
| Magnesium suspension with 2% of additive | 9 |
| Magnesium suspension with 3% of additive | 8 |
| Cement suspension at a 15% | 12 |

The best results were obtained with the hydroxide suspensions containing 2% and 3% of additive compound that improves the adhesion of the suspension to the pellets.

Finally, it should be understood that the method for avoiding the agglomeration of pellets of several kinds of materials when treated at high temperatures of the present invention, is not limited exclusively to the above described and illustrated embodiments and that persons having ordinary skill in the art can, with the teaching provided by this invention, make modifications to the long term-stabilized magnesium hydroxide suspension for covering iron mineral and the process for its production and application of the present invention, which will clearly be within the true inventive concept and scope of the invention which is claimed in the following claims.

We claim:

1. A method for avoiding the agglomeration of pellets of several kinds of materials when treated at high temperatures, which comprises: covering the pellets with a long-term stabilized magnesium hydroxide suspension, wherein the long-term stabilized magnesium hydroxide suspension has a solids content of about 51% to 61%; a water content of about 39% to 49%; a viscosity of about 500 to 1,500 cp.; an average particle size of about 1 to 2.5 microns; a $Mg(OH)_2$ content of about 50% to 60%; a chloride content of less than about 0.6% on a dry basis; a calcium content of less than about 1% on a dry basis; a pH of about 10.5 to 12; an equivalent magnesium oxide content of about 34% to 42%; a specific gravity of about 1.42 to 1.52, and including at least one anionic polyelectrolyte as a dispersant agent, at a concentration of at least about 25%, in an amount of about 0.5 to about 2.5%, by weight, on a dry basis and an adherent compound a compound that improves the adhesion of the suspension to the pellets selected from the group consisting of styrene-acrylic emulsions having a concentration of at least about 30%, by weight, in an amount of about 0.5 to about 5%, by weight, on a dry basis; adapted to being stored for at least three months without substantial agitation and without experiencing substantial settlement, while avoiding the formation of a solid, hard substrate.

2. A method for avoiding the agglomeration of pellets of several kinds of materials when treated at high temperatures. which comprises: covering the pellets with a long-term stabilized magnesium hydroxide suspension, wherein the long-term stabilized magnesium hydroxide suspension comprises a solids content of about 51% to 61% by weight; a water content of about 39% to 49% by weight; a viscosity of about 500 to 1,500 cp.; an average particle size of about 1 to 2.5 microns; a Mg(OH)/ content of about 50% to 60% by weight; a chloride content of less than about 0.6% by weight on a dry basis; a calcium content of less than about 1% by weight on a dry basis; a pH of about 10.5 to 12; an equivalent magnesium oxide content of about 34% to 42% by weight; a specific gravity of about 1.42 to 1.52, and including at least one anionic polyelectrolyte as a dispersant agent, at a concentration of at least about 25%, by weight, in an amount of about 0.5 to about 2.5%, by weight, on a dry basis and a compound that improves the adhesion of the suspension to the pellets selected from the group consisting of styrene-acrylic emulsions having a concentration of at least about 30%, by weight, in an amount of about 0.5 to about 5%, by weight, on a dry basis; adapted to being stored for at least three months without substantial agitation and without experiencing substantial settlement, while avoiding the formation of a solid, hard substrate; and wherein the anionic polyelectrolyte is selected from the group consisting of sodium polyacrylate and ammonium polystyrene/maleate.

3. A method for avoiding the agglomeration of pellets of several kinds of materials when treated at temperatures of between about 900° C. to 1,000° C., which comprises: covering the pellets with a long-term stabilized magnesium hydroxide suspension which comprises a solids content of about 55% by weight; a water content of about 44% by weight; a viscosity of about 1,000 cp; an average particle size of about 2.0 microns; a Mg(OH)z content of about 55% by weight; a chloride content of about 0.30% by weight; a calcium content of about 0.45% by weight; a pH of about 11.7; an equivalent magnesium oxide content of about 38% by weight; a specific gravity of about 1.47; and including at least one anionic polyelectrolyte as a dispersant agent, at a concentration of about 40%, by weight, in an amount of about 1%, by weight, on a dry basis and a compound that improves the adhesion of the suspension to the pellets selected from the group consisting of styrene-acrylic emulsions having a concentration of at least about 30%, by weight, in an amount of about 1.5% to 2.0%, by weight, on a dry basis; adapted to being stored for at least three months without substantial agitation and without experiencing substantial settlement, while avoiding the formation of solid, hard substrate.

* * * * *